US009736074B2

(12) United States Patent
Venkatachalam et al.

(10) Patent No.: US 9,736,074 B2
(45) **Date of Patent: *Aug. 15, 2017**

(54) HANDLING USER PLANE CONGESTION IN A WIRELESS COMMUNICATION NETWORK

(71) Applicant: Intel Corporation, Santa Clara, CA (US)

(72) Inventors: Muthaiah Venkatachalam, Beaverton, OR (US); Puneet Jain, Hillsboro, OR (US); Eric Siow, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/754,173

(22) Filed: Jun. 29, 2015

(65) Prior Publication Data

US 2015/0381497 A1 Dec. 31, 2015

Related U.S. Application Data

(63) Continuation of application No. 13/563,508, filed on Jul. 31, 2012, now Pat. No. 9,071,999.

(Continued)

(51) Int. Cl.

*H04L 12/803* (2013.01)
*H04W 48/06* (2009.01)

(Continued)

(52) U.S. Cl.

CPC ........... *H04L 47/122* (2013.01); *H04B 7/024* (2013.01); *H04L 1/0026* (2013.01); *H04W 24/10* (2013.01);

(Continued)

(58) Field of Classification Search

None

See application file for complete search history.

(56) References Cited

U.S. PATENT DOCUMENTS 7,822,861 B2 * 10/2010 Annic ................ H04L 12/5692 709/225
2003/0137938 A1 * 7/2003 Belanger ................ H04L 12/14 370/230

(Continued)

FOREIGN PATENT DOCUMENTS

CN 101459928 A 6/2009
CN 102118830 A 7/2011

(Continued)

OTHER PUBLICATIONS

International Search Report and Written Opinion for International App. No. PCT/US2013/024646, mailed May 24, 2013.

(Continued)

*Primary Examiner* — Andrew Lai
*Assistant Examiner* — Jamaal Henson
(74) *Attorney, Agent, or Firm* — Schwabe, Williamson & Wyatt, P.C.

(57) ABSTRACT

Embodiments of the present disclosure describe devices, methods, computer-readable media and systems configurations for handling user plane congestion in a wireless communications network. A packet data network gateway (PGW) and/or a serving gateway (SGW) may proactively transmit a congestion notification to a mobility management entity (MME) including a level of congestion of the PGW and/or SGW. The MME may receive congestion notifications from a plurality of PGWs and/or SGWs. The MME may receive a request for a packet data network (PDN) connection from a user equipment (UE), and may take an action in response to the request based on the reported levels of congestion. The action may include selecting a PGW (Continued)

and/or SGW for the PDN connection, notifying the UE that the PDN connection cannot be established, and/or negotiating with the UE to terminate or modify one or more existing PDN connections in exchange for establishing the new PDN connection.

10 Claims, 7 Drawing Sheets

Related U.S. Application Data

(60) Provisional application No. 61/595,576, filed on Feb. 6, 2012.

(51) Int. Cl.
*H04W 28/12* (2009.01)
*H04B 7/024* (2017.01)
*H04W 24/10* (2009.01)
*H04W 76/02* (2009.01)
*H04W 28/08* (2009.01)
*H04L 1/00* (2006.01)
*H04W 28/02* (2009.01)
*H04W 4/00* (2009.01)
*H04W 76/06* (2009.01)
*H04L 25/02* (2006.01)
*H04L 1/06* (2006.01)

(52) U.S. Cl.
CPC ....... *H04W 28/0289* (2013.01); *H04W 28/08* (2013.01); *H04W 28/12* (2013.01); *H04W 48/06* (2013.01); *H04W 76/027* (2013.01); *H04L 1/06* (2013.01); *H04L 25/0204* (2013.01); *H04L 25/0224* (2013.01); *H04L 2001/0093* (2013.01); *H04W 4/005* (2013.01); *H04W 76/066* (2013.01)

(56) References Cited

U.S. PATENT DOCUMENTS

2007/0153695 A1* 7/2007 Gholmieh ........... H04L 43/0882 370/235
2008/0008091 A1 1/2008 Yumoto et al.
2009/0196177 A1* 8/2009 Teyeb .................. H04B 7/2606 370/231
2009/0245108 A1* 10/2009 Wu ......................... H04L 47/10 370/233
2010/0195493 A1 8/2010 Hedman et al.
2010/0281157 A1 11/2010 Ramankutty et al.
2010/0318670 A1 12/2010 Al-Shalash et al.
2011/0032819 A1 2/2011 Schliwa-Bertling et al.
2011/0170408 A1 7/2011 Furbeck et al.
2011/0188403 A1 8/2011 Calippe et al.
2011/0261695 A1* 10/2011 Zhao ..................... H04W 28/10 370/232
2011/0267948 A1* 11/2011 Koc ........................ H04L 5/003 370/235
2012/0082029 A1* 4/2012 Liao .................... H04W 76/025 370/230
2012/0084449 A1* 4/2012 Delos Reyes ....... H04L 61/1511 709/229
2013/0051228 A1 2/2013 Kim et al.
2013/0286828 A1 10/2013 Cho et al.
2014/0003233 A1* 1/2014 Rune ..................... H04L 47/125 370/230

FOREIGN PATENT DOCUMENTS

CN 102342144 A 2/2012
WO WO 2010/102127 A1 9/2010
WO 2011160308 A1 12/2011
WO WO 2012/097875 A1 7/2012
WO WO 2012097875 A1 * 7/2012 ........... H04L 47/125

OTHER PUBLICATIONS

International Preliminary Report on Patentability mailed Aug. 21, 2014 from International Application No. PCT/US2013/024646.
Motorola, "Reactive Load management for MTC Devices," 3GPP TSG SA WG2, TS S2-103176, Jul. 6-13, 2010, Elbonia, 7 pages.
Office Action issued Aug. 18, 2015 from Japanese Patent Application No. 2014-555819.
Office Action issued Jun. 19, 2015 from Korean Patent Application No. 2014-7021929.
Office Action mailed Dec. 15, 2015 for Japanese Application No. 2014-555819, 4 pages.
Extended European Search Report mailed Jan. 14, 2016 for European Application No. 137460572; 11 pages.
Sierra Wireless, "Broadcasting of MTC Access Barring", 3GPP TSG SA WG2 Meeting #9E (Electronic)TD S2-103114, Jun. 29, 2010, http:/www.3gpp.org/ftp/tsg_sa/WG2_Arch/TSGS2-79E_Elbonia/Docs/S2-103114.zip; 10 pages.
Partial Supplementary European Search Report mailed Sep. 15, 2015 for European Application No. 13746057.2; 6 pages.
Huawei: "Solution for congestion situation indication", 3GPP Draft; S2-103161_s0luti0n for Congestion Situation Indication, 3rd Generation Partnership Project (3GPP), Mobile Competence Centre ; 650, Route Des Luci0les ; F-06921 Sophia-Antipolis Cedex ; France, vol. SA WG2, No. Elbonia; Jun. 29, 2010, 4 pages.
Office Action mailed Sep. 25, 2015 for Canadian Application No. 2,861,432, 4 pages.
Office Action issued Apr. 5, 2016 from Chinese Patent Application No. 201380008211.3, 25 pages.
Motorola, "Reactive load Management for MTC Devices," 3GPP TSG SA WG2 Meeting #79E (Electronic), TD S2-103176, Agenda Item: 2.2, Jul. 6-13, 2010, Elbonia, 5 pages.
Second Office Action issued Nov. 23, 2016 from Chinese Patent Application No. 201380008211.3, 24 pages.

* cited by examiner

HANDLING USER PLANE CONGESTION IN A WIRELESS COMMUNICATION NETWORK

CROSS REFERENCE TO RELATED APPLICATIONS

The present application is a continuation of U.S. patent application Ser. No. 13/563,508, filed Jul. 31, 2012, entitled "HANDLING USER PLANE CONGESTION IN A WIRELESS COMMUNICATION NETWORK," which claims priority to U.S. Provisional Patent Application No. 61/595,576, filed Feb. 6, 2012, entitled "ADVANCED WIRELESS COMMUNICATION SYSTEMS AND TECHNIQUES," the entire disclosures of which are hereby incorporated by reference.

FIELD

Embodiments of the present invention relate generally to the field of communications, and more particularly, to handling user plane congestion in a wireless communication network.

BACKGROUND

Many wireless communication networks include a user plane (also referred to as a data plane) for handling packet data network (PDN) connections with a user equipment (UE). When the UE requests a PDN connection, the request is routed through a mobility management entity (MME), a serving gateway (SGW), and a packet data network gateway (PGW). However, the SGW and/or PGW may become overloaded due to congestion caused by other UEs and/or other PDN connections. In this case, the request may be rejected by the PGW, and a notification is routed back to the UE that the PDN connection cannot be established.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Illustrative embodiments of the present disclosure include, but are not limited to, methods, systems, computer-readable media, and apparatuses for handling user plane congestion in a wireless communication network.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B". The phrase "at least one of A, B and C" means (A), (B), (C), (A and B), (A and C), (B and C) or (A, B and C). The phrase "(A) B" means (B) or (A and B), that is, A is optional.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
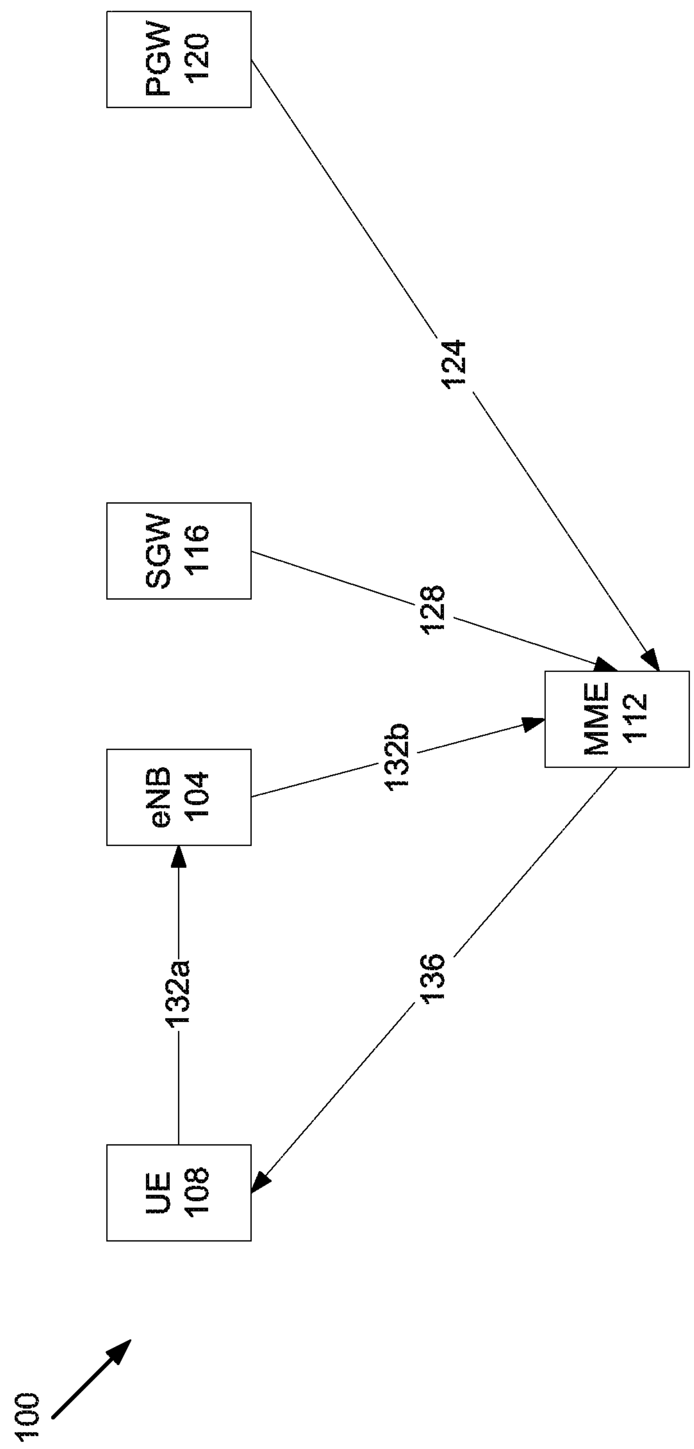
FIG. 1 schematically illustrates a wireless communication network in accordance with various embodiments.

FIG. 1 schematically illustrates a wireless communication network 100 in accordance with various embodiments. Wireless communication network 100 (hereinafter "network 100") may be an access network of a 3rd Generation Partnership Project (3GPP) long-term evolution (LTE) network such as evolved universal mobile telecommunication system (UMTS) terrestrial radio access network (E-UTRAN). The network 100 may include a base station, e.g., enhanced node base station (eNB) 104, configured to wirelessly communicate with user equipment (UE) 108. The network 100 may further include a mobility management entity (MME) 112, a serving gateway (SGW) 116, and/or a packet data network gateway (PGW) 120. The SGW 116 and PGW 120 may be included in a user plane (also referred to as the data plane) of the network 100.

Figure 2:
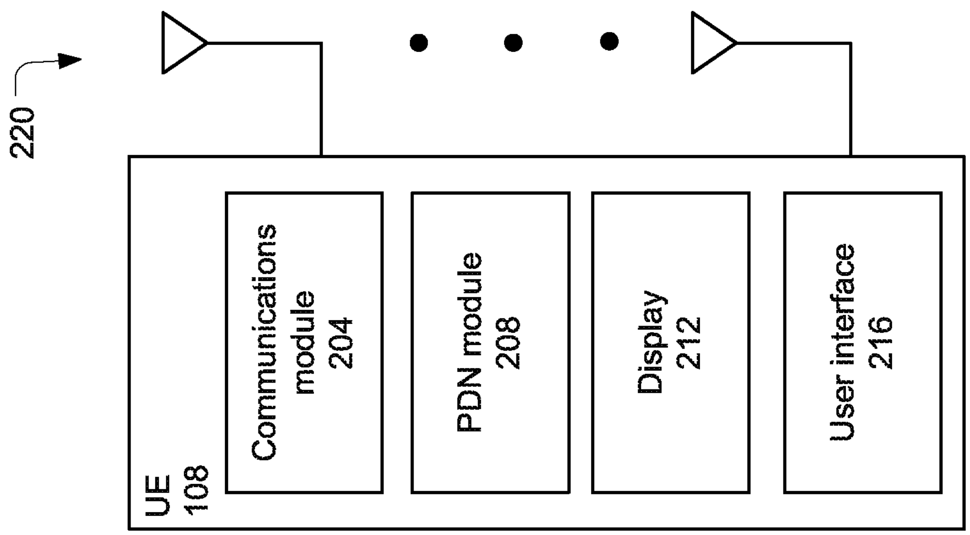
FIG. 2 is a block diagram illustrating a user equipment in accordance with various embodiments.

As shown in FIG. 2, the UE 108 may include a communications module 204 and a packet data network (PDN) module 208 coupled to one another at least as shown. In some embodiments, the UE 108 may further include a display 212 to display images, data and/or other information to the user, and a user interface 216 for a user of the UE 108 to input data/commands and/or otherwise interact with UE 108. In some embodiments, the display 212 may be integrated with the user interface 216, such as in a touch-screen display. The user interface 216 may alternatively or additionally include other means for user input, such as a keyboard, one or more buttons, and/or a voice control system.

The communications module 204 may be further coupled with one or more of a plurality of antennas 220 of the UE 108 for communicating wirelessly over network 100. The UE 108 may include any suitable number of antennas 220. One or more of the antennas 220 may be alternately used as transmit or receive antennas. Alternatively, or additionally, one or more of the antennas 220 may be dedicated receive antennas or dedicated transmit antennas.

Figure 3:
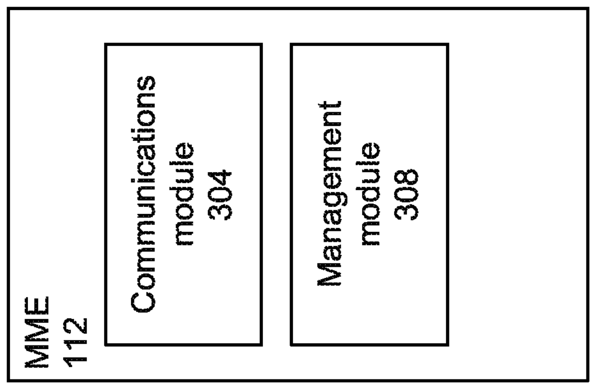
FIG. 3 is a block diagram illustrating a mobility management entity (MME) in accordance with various embodiments.

As shown in FIG. 3, MME 112 may include a communications module 304 and a management module 308 coupled to one another. The communications module 344 may be configured to communicate with the eNB 104, UE 108, SGW 116, and/or PGW 120, whether directly and/or indirectly. The communications module 344 may communicate with the other components of network 100 through a wired or wireless connection.

Figure 5:
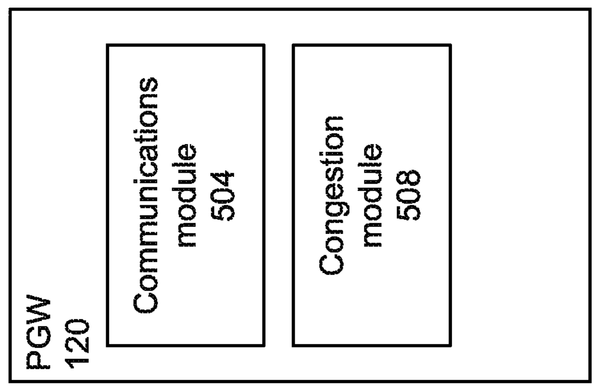
FIG. 5 is a block diagram illustrating a packet data network gateway in accordance with various embodiments.
Figure 4:
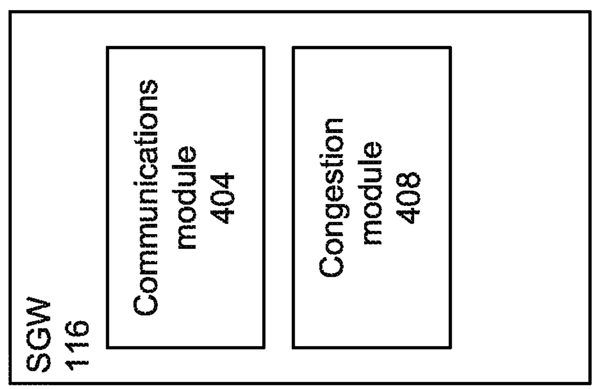
FIG. 4 is a block diagram illustrating a serving gateway in accordance with various embodiments.

FIG. 4 shows SGW 116 and FIG. 5 shows PGW 120 in accordance with various embodiments. The SGW 116 may include a communications module 404 coupled with a congestion module 408 (also referred to as SGW congestion module 408), while the PGW 120 may include a communications module 504 coupled with a congestion module 508 (also referred to as PGW congestion module 508). In some embodiments, the SGW 116 and PGW 120 may be integrated into a single device. In other embodiments, the SGW 116 and PGW 120 may be separate devices.

In various embodiments, the eNB 104, UE 108, MME 112, SGW 116, and/or PGW 120 may include more or less components than are shown in FIGS. 1-5.

The network 100 may include a plurality of SGWs 116 and/or PGWs 120. The PGWs 120 may provide one or more PDN connections for the UE 108. The PDN connections may allow the UE 108 to access an external network, such as the internet. The PDN connections may be routed through an SGW 116. In some embodiments, one or more PGWs 120 may be associated with an individual SGW 116. In other embodiments, a plurality of SGWs 116 may be communicatively coupled with a given PGW 120 so that any of the plurality of SGWs may be used to route the PDN connection from the UE 108 to the PGW 120.

In various embodiments, the congestion module 508 of the PGW 120 may determine a level of congestion of the PGW 120. The congestion may be due to ongoing PDN connections handled by the PGW 120 for UEs of the network 100 (e.g., UE 108) and/or other factors. The PGW 120 may proactively report the level of congestion to the MME 112. For example, referring again to FIG. 1, the level of congestion may be included in a PGW congestion notification 124 transmitted to the MME 112 (e.g., via the communications module 504). By "proactively," it is meant that the PGW congestion notification 124 is sent independently of any UE requests for a PDN connection that may be received by the PGW 120.

In some embodiments, the PGW congestion notification 124 may include a level of congestion associated with one or more access point names (APN) associated with the PGW 120.

Additionally, or alternatively, the congestion module 408 of the SGW 116 may determine a level of congestion of the SGW 116 (e.g., due to ongoing connections handled by the SGW 116 and/or other factors). The SGW 116 may proactively report the level of congestion to the MME 112 (e.g., in an SGW congestion notification 128 transmitted to the MME 112 via the communications module 404).

In some embodiments, the level of congestion may indicate the congestion at the PGW 120 or SGW 116 relative to one or more thresholds. For example, the level of congestion may indicate whether the congestion is higher or lower than a threshold value. Alternatively, multiple threshold values may be used. For example, the congestion level may indicate if the congestion is above a high threshold, indicating a high congestion level, or below a low threshold, indicating a low congestion level. The high threshold and low threshold may be set at different congestion levels. In some embodiments, the PGW 120 and/or SGW 116 may accept new connections when the congestion level is low congestion, and may not accept new connections when the congestion level is high congestion.

In other embodiments, a plurality of high thresholds and/or a plurality of low thresholds may be used. The level of congestion may be one of a plurality of levels indicating high congestion (e.g., H1, H2, . . . Hn) or one of a plurality of levels indicating low congestion (e.g., L1, L2, . . . Ln).

In other embodiments, the level of congestion may report a numerical value representing the congestion of the PGW 120 or SGW 116 (e.g., 90% congestion).

In various embodiments, the PGW 120 and/or SGW 116 may send congestion notifications 124 and/or 128, respectively, to the MME 112 periodically (e.g., at a pre-defined interval) and/or if their respective level of congestion changes.

In various embodiments, the MME 112 may receive proactive congestion notifications 124 and/or 128 from the plurality of PGWs 120 and/or SGWs 116 of the network 100. The management module 308 of the MME 112 may manage access to the PGWs 120 and/or SGWs 116 by the UE 108 based on the levels of congestion included in the proactive congestion notifications 124 and/or 128. In embodiments in which the proactive congestion notification 124 for a PGW 120 indicates a congestion level for one or more APNs associated with the PGW 120, the MME 112 may manage access to the APNs independently of the PGW 120 as a whole (e.g., may deny access to a particular APN associated with a PGW, but allow access to another APN associated with the PGW).

For example, the MME 112 may receive a PDN connection request 132 from the UE 108 requesting setup of a new PDN connection for the UE 108. The PDN connection request 132 may be sent from the UE 108 to the eNB (shown as transmission 132*a* in FIG. 1), and then forwarded from the eNB 104 to the MME 112 (shown as transmission 132*b* in FIG. 1). The MME 112 may take an action in response to the request 132 based on the levels of congestion of the PGWs 120 and/or SGWs 116. In some embodiments, the MME 112 may only consider the levels of congestion of either the PGWs 120 or SGWs 116 when choosing the appropriate action, while in other embodiments the MME 112 may choose the appropriate action based on the levels of congestion of both the PGWs 120 and the SGWs 116.

The MME 112 may send a notification 136 to the UE 108 to notify the UE 108 of the selected action. For example, the action may include allowing the PDN connection and selecting a PGW 120 and/or SGW 116 to provide the PDN connection for the UE 108. In that case, the notification 136 may notify the UE 108 that the PDN connection is successful. Alternatively, the action may include denying the PDN connection and notifying the UE 108 (via the notification 136) that the new connection cannot be established. As another option, the MME 112 may negotiate with the UE 108 to terminate or modify an existing PDN connection in exchange for establishing the new PDN connection. The notification 136 may initiate the negotiation process, as further discussed below.

Different actions may be assigned to different threshold levels. The threshold levels assigned to each action may be determined by an operator of the network 100. In some embodiments, the MME 112 may determine the appropriate action based on an indication of an overall congestion of the PGWs 120 and/or SGWs 116, such as an average of the reported congestion levels. In other embodiments, the MME 112 may determine the appropriate action based on a subset of the reported congestion levels, such as the lowest and/or highest reported congestion levels.

The MME 112 may attempt to establish the new PDN connection if one or more of the PGWs 120 and/or SGWs 116 have reported congestion levels low enough to accept new connections (e.g., below a low threshold). In some embodiments, the PGW 120 may be selected prior to selecting the SGW 116.

The MME 112 may select a PGW 120 to provide the new PDN connection based on the levels of congestion reported for the plurality of PGWs 120. In some embodiments, the MME 112 may select the PGW 120 having the lowest reported congestion level of the plurality of PGWs 120. In some embodiments, other factors may be taken into account in addition to the reported congestion level. In that case, the MME 112 may select a PGW 120 from a group of PGWs 120 for which the reported congestion level indicates that new PDN connections are available, even if the selected PGW 120 does not have the lowest reported congestion level.

In some embodiments, there may be a targeted PGW 120 that is preferred and/or required by the network 100 for the new PDN connection with the UE 108. In that case, the MME 112 may look at the reported congestion level for the targeted PGW 120 to determine if the targeted PGW 120 is able to accept the new PDN connection. If the targeted PDN 120 is able to accept the new PDN connection, the MME 112 may set up the PDN connection between the UE 108 and the targeted PGW 120.

If the MME 112 is able to select a suitable PGW 120 for the new PDN connection, the MME 112 may then select an SGW 116 through which to route the new PDN connection. In some embodiments, the SGW 116 may be selected from the plurality of SGWs 116 based on their reported congestions levels. In embodiments in which a specific SGW 116 is associated with the selected PGW 120, the MME 112 may look at the reported congestion level of the specific SGW 116 to determine if the SGW 116 can accept a new connection.

The MME 112 may set up the new PDN connection with the UE 108 if the MME 112 is able to successfully select a suitable PGW 120 and a suitable SGW 116. The MME may forward the PDN connection request to the PGW 120. Additionally, the MME 112 may transmit a notification to the UE 108 that the PDN connection is successful.

If there are no suitable PGWs 120 and/or SGWs 116 for the MME 112 to choose from (e.g., no PGWs 120 and/or SGWs 116 with a low reported congestion), the MME 112 may send the notification 136 to the UE 108 indicating that the PDN connection cannot be established. The proactive notifications 124 and/or 128 may allow the MME 112 to provide the notification to the UE 108 relatively quickly compared with conventional systems.

In conventional systems that do not provide proactive congestion notifications, the PDN connection request must be routed from the MME to the PGW through the SGW. The PGW will reject the PDN connection request if the PGW is congested, and the rejection is then routed back through the MME to the UE. This adds considerable delay between when the UE sends the PDN connection request and when the UE receives the notification that the PDN connection cannot be established. Furthermore, the PDN connection request is sent to the PGW even when the PGW is overloaded. Additionally, an overloaded SGW is not considered in conventional systems.

In contrast, the MME 112 described herein may quickly notify the UE 108 if the PDN connection cannot be established. Additionally, the MME 112 may not forward the PDN connection request 132 to the PGW 120 if the PGW 120 is overloaded (e.g., has a high reported congestion level). Moreover, the MME 112 may consider the congestion level of the SGWs 116 when deciding whether to establish the requested PDN connection and/or selecting the SGW 116 to use for the PDN connection.

Figure 6:
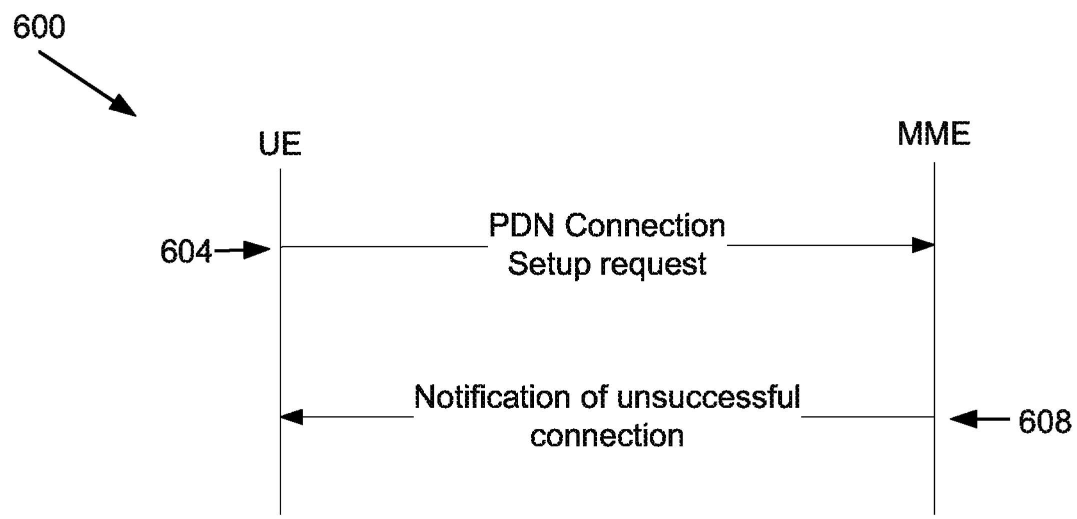
FIG. 6 is a flowchart illustrating a method of managing packet data network connection requests with a congested user plane in accordance with various embodiments.

For example, FIG. 6 illustrates a method 600 in accordance with various embodiments. At 604, a UE (e.g., UE 108) transmits a PDN connection request to an MME (e.g., MME 112). At 608, the MME may transmit a notification to the UE indicating that the connection was unsuccessful. The MME may transmit the notification, for example, if the PGWs and/or SGWs have reported congestions above a threshold. The MME may have proactive congestion notifications from the PGWs and/or SGWs, so the MME may not need to forward the PDN connection request to the PGWs or SGWs before responding to the UE. Accordingly, the UE may receive the notification of unsuccessful connection relatively quickly.

In some embodiments, and/or under some circumstances, the MME 112 may initiate a negotiation process with the UE 108 instead of denying the PDN connection. The negotiation process may give an option to the UE 108 to terminate or modify one or more existing PDN connections in exchange for establishing the new PDN connection.

Figure 7A:
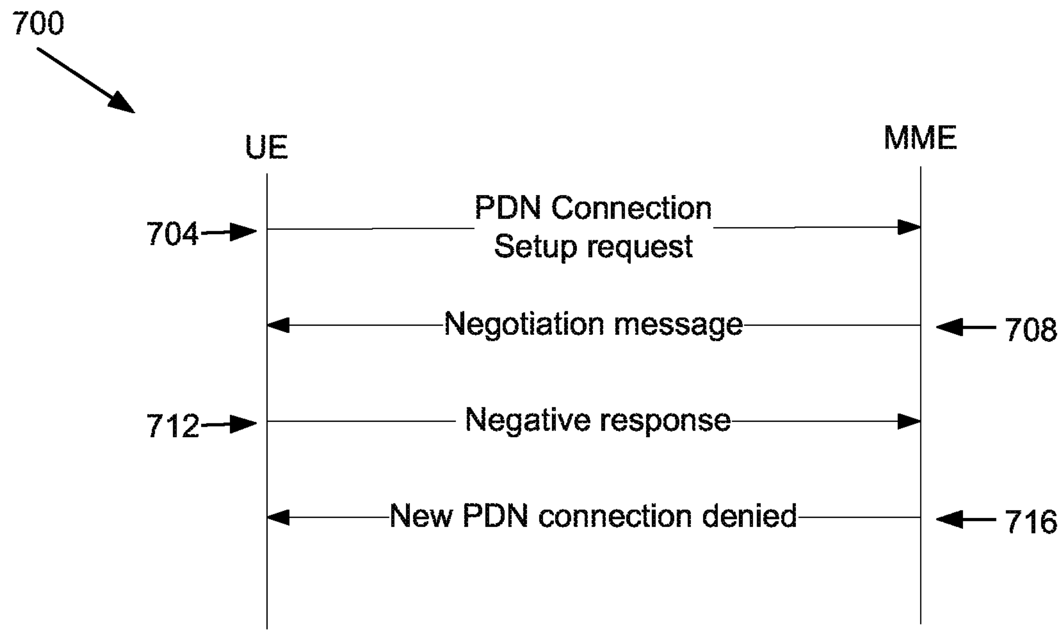
FIG. 7*a* is a flowchart illustrating a negotiation method that may be performed by a user equipment and a mobility management entity in accordance with various embodiments.
Figure 7B:
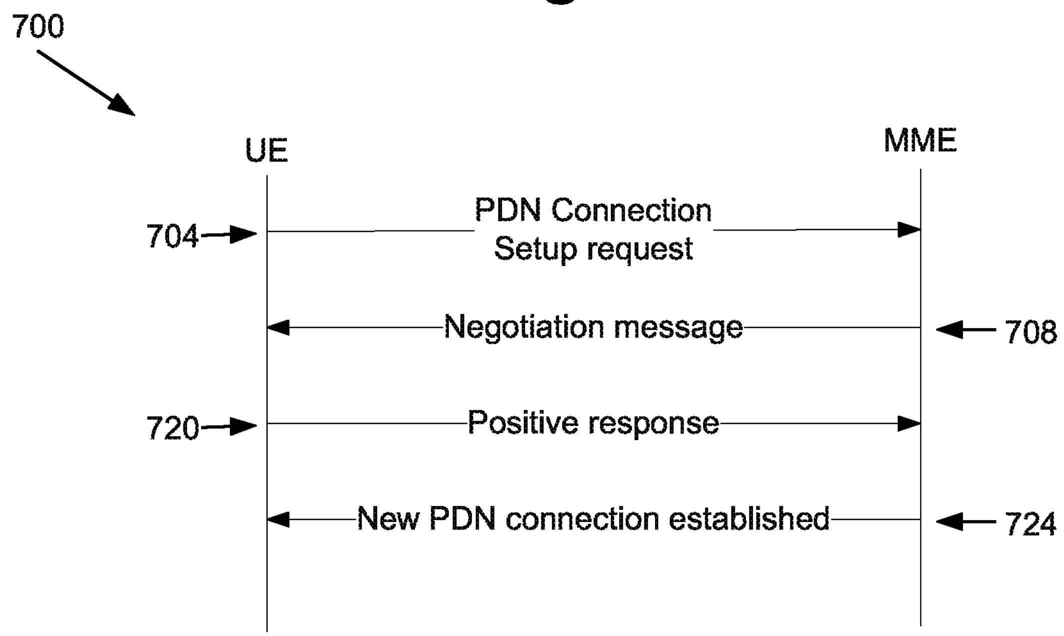
FIG. 7*b* is a flowchart illustrating an alternative embodiment of a negotiation method that may be performed by a user equipment and a mobility management entity.

A flowchart of an example negotiation process 700 is shown in FIGS. 7*a* and 7*b*. In some embodiments, the negotiation process 700 may be performed via non access stratum (NAS) signaling. As further discussed below, FIG. 7*a* illustrates an embodiment in which the UE sends a negative response to a negotiation message, while FIG. 7*b* illustrates an embodiment in which the UE sends a positive response to the negotiation message.

At 704, a UE (e.g., UE 108) may send a PDN connection request to an MME (e.g., MME 112) indicating the UE wishes to establish a PDN connection. At 708, the MME may send a negotiation message to the UE giving the UE an option to terminate or modify one or more existing PDN connections in exchange for establishing the new PDN connection. The MME may send the negotiation message, for example, if the reported congestion levels of the PGWs and/or SGWs are above a threshold.

In some embodiments, the UE may present the option to a user of the UE (e.g., via a display). For example, the display may list the existing PDN connections for the UE with an option to terminate or modify one or more of the existing PDN connections. In some embodiments, modifying the PDN connection may include reducing the bandwidth and/or quality of service (QoS) required by the PDN connection. In some embodiments, the UE may present multiple options to the user. For example, the user may be able to choose one or more PDN connections to terminate or modify from among a plurality of existing PDN connections. The user may also be given the option not to modify any of the existing PDN connections, in which case the new PDN connection may not be established. The user may select an option (e.g., using a user interface of the UE).

In other embodiments, the UE may determine a response to the negotiation message autonomously (without presenting the option to the user). For example, the UE may determine the response based on priority settings of the UE. In some embodiments, the priority settings may be set and/or modified by the user. The priority settings may prioritize certain types of PDN connections over other types of PDN connections.

In some cases, as shown at 712 in FIG. 7*a*, the UE may transmit a negative response to the MME in response to the negotiation message. Accordingly, at 716, the MME may deny the requested PDN connection and maintain the existing PDN connections.

Alternatively, as shown at 720 in FIG. 7*b*, the UE may transmit a positive response to the MME in response to the negotiation message. Accordingly, at 724, the MME may terminate or modify one or more of the existing PDN connections (e.g., as dictated by the response) and establish the requested PDN connection.

The negotiation process 700 may give the UE flexible options for managing and/or prioritizing PDN connections on the network.

In embodiments in which the PGWs and/or SGWs are configured to report multiple congestion levels, the MME may choose different actions depending on the reported congestion levels. Additionally, or alternatively, the operator of the network may set the congestion levels that trigger different actions. For example, a first high congestion level may cause the MME to negotiate with the UE to set up the new PDN connection, while a second high congestion level that is higher than the first high congestion level may cause the MME to deny the new PDN connection without negotiation.

Additionally, or alternatively, the UE may be permitted to have a given number of concurrent PDN connections depending on the reported congestion level. For example, the UE may be permitted to have three concurrent PDN connections at one congestion level, two concurrent PDN connections at a higher congestion level, and one concurrent PDN connection at an even higher congestion level. The MME may allow, deny, and/or negotiate the PDN connection request depending on the reported congestion levels and the number of existing PDN connections of the UE.

Figure 8:
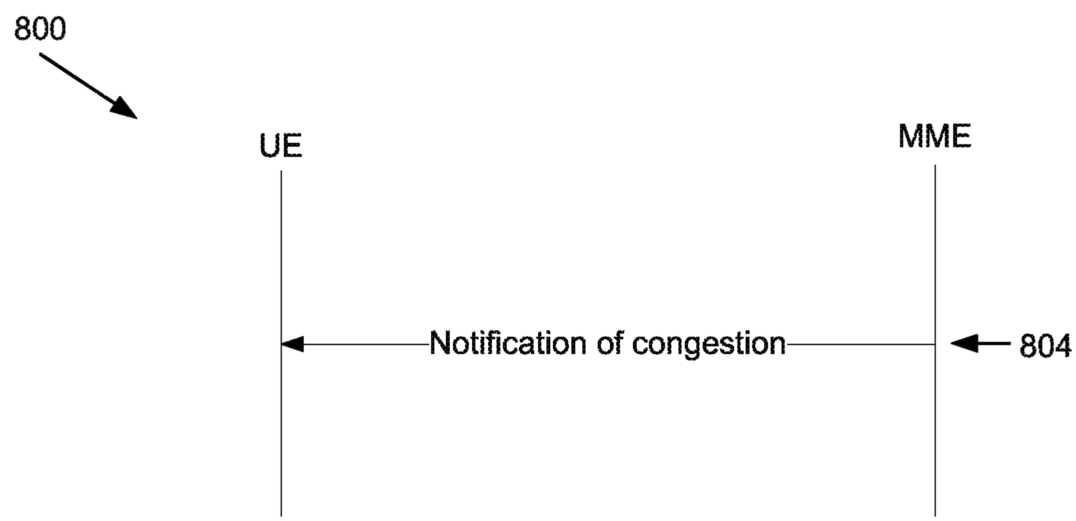
FIG. 8 is a flowchart illustrating a method of proactive congestion notification in accordance with various embodiments.

In some embodiments, the MME 112 may proactively report the congestion level of the user plane (e.g., the PGWs 120 and/or SGWs 116) to the UE 108. FIG. 8 illustrates a method 800 for proactively reporting the congestion level in accordance with various embodiments. At 804, an MME (e.g., MME 112) may proactively transmit a notification of the user plane congestion level to a UE (e.g., UE 108). The notification may be transmitted independently (e.g., not in response to) any request for PDN connection received from the UE.

The transmission of the congestion notification may be triggered by any suitable conditions and/or sent periodically. For example, the MME 112 may proactively report the congestion level to the UE 108 if the overall congestion of the user plane is above a threshold to indicate that PDN connections are not currently available and/or may be difficult. In some embodiments, the MME 112 may additionally or alternatively report the congestion level to the UE 108 if the overall congestion is below a threshold to indicate that PDN connections are currently available. This may provide useful information for the user of the UE 108 to decide whether to request a PDN connection or not. As a result, the network 100 may receive fewer PDN connection requests when the user plane is congested.

Figure 9:
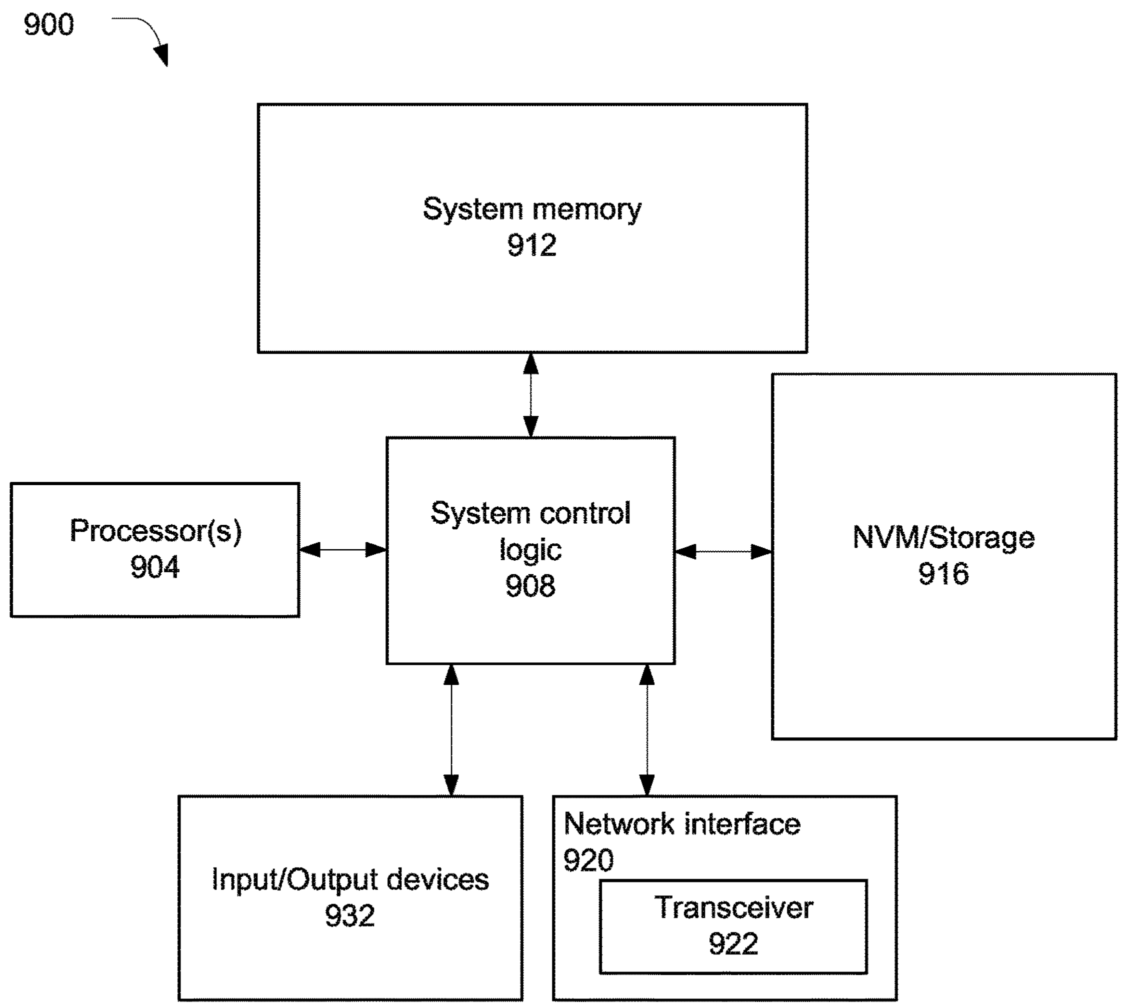
FIG. 9 schematically depicts an example system in accordance with various embodiments.

The eNB 104, UE 108, MME 112, SGW 116, and/or PGW 120 described herein may be implemented into a system using any suitable hardware and/or software to configure as desired. FIG. 9 illustrates, for one embodiment, an example system 900 comprising one or more processor(s) 904, system control logic 908 coupled with at least one of the processor(s) 904, system memory 912 coupled with system control logic 908, non-volatile memory (NVM)/storage 916 coupled with system control logic 908, a network interface 920 coupled with system control logic 908, and input/output (I/O) devices 932 coupled with system control logic 908.

The processor(s) 904 may include one or more single-core or multi-core processors. The processor(s) 904 may include any combination of general-purpose processors and dedicated processors (e.g., graphics processors, application processors, baseband processors, etc.).

System control logic 908 for one embodiment may include any suitable interface controllers to provide for any suitable interface to at least one of the processor(s) 904 and/or to any suitable device or component in communication with system control logic 908.

System control logic 908 for one embodiment may include one or more memory controller(s) to provide an interface to system memory 912. System memory 912 may be used to load and store data and/or instructions, for example, for system 900. System memory 912 for one embodiment may include any suitable volatile memory, such as suitable dynamic random access memory (DRAM), for example.

NVM/storage 916 may include one or more tangible, non-transitory computer-readable media used to store data and/or instructions, for example. NVM/storage 916 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 916 may include a storage resource physically part of a device on which the system 900 is installed or it may be accessible by, but not necessarily a part of, the device. For example, the NVM/storage 916 may be accessed over a network via the network interface 920 and/or over Input/Output (I/O) devices 932.

Network interface 920 may have a transceiver 922 to provide a radio interface for system 900 to communicate over one or more network(s) and/or with any other suitable device. The transceiver 922 may implement communications module 204. In various embodiments, the transceiver 922 may be integrated with other components of system 900. For example, the transceiver 922 may include a processor of the processor(s) 904, memory of the system memory 912, and NVM/Storage of NVM/Storage 916. Network interface 920 may include any suitable hardware and/or firmware. Network interface 920 may include a plurality of antennas to provide a multiple input, multiple output radio interface. Network interface 920 for one embodiment may include, for example, a wired network adapter, a wireless network adapter, a telephone modem, and/or a wireless modem.

For one embodiment, at least one of the processor(s) 904 may be packaged together with logic for one or more controller(s) of system control logic 908. For one embodiment, at least one of the processor(s) 904 may be packaged together with logic for one or more controllers of system control logic 908 to form a System in Package (SiP). For one embodiment, at least one of the processor(s) 904 may be integrated on the same die with logic for one or more controller(s) of system control logic 908. For one embodiment, at least one of the processor(s) 904 may be integrated on the same die with logic for one or more controller(s) of system control logic 908 to form a System on Chip (SoC).

In various embodiments, the I/O devices 932 may include user interfaces designed to enable user interaction with the system 900, peripheral component interfaces designed to enable peripheral component interaction with the system 900, and/or sensors designed to determine environmental conditions and/or location information related to the system 900.

In various embodiments, the user interfaces could include, but are not limited to, a display (e.g., a liquid crystal display, a touch screen display, etc.), a speaker, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, a universal serial bus (USB) port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 920 to communicate with components of a positioning network, e.g., a global positioning system (GPS) satellite.

In various embodiments, the system 900 may be a mobile computing device such as, but not limited to, a laptop computing device, a tablet computing device, a netbook, a smartphone, etc. In various embodiments, system 900 may have more or less components, and/or different architectures.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. An apparatus to be employed by a mobility management entity (MME), the apparatus comprising:

communications circuitry to communicate with a plurality of serving gateways (SGWs) and a plurality of packet data network gateways (PGWs) of a wireless communication network; and management circuitry coupled to the communications circuitry, the management circuitry configured to:

receive congestion notifications from one or more of the PGWs or SGWs to indicate respective levels of congestion for the one or more PGWs or SGWs;

receive a packet data network (PDN) request from a user equipment (UE) to establish a new PDN connection with the wireless communication network via an evolved Node B (eNB);

transmit, to the UE responsive to the received PDN request and a determination that the levels of congestion of the one or more PGWs or SGWs indicate a high network congestion level that is greater than a threshold, a negotiation message giving the UE an option to terminate or modify an existing PDN connection associated with the eNB in exchange for establishing the new PDN connection;

receive a negative response to the negotiation message;

deny the new PDN connection based on the negative response; and maintain the existing PDN connection based on the negative response.

2. The apparatus of claim 1, wherein the request for the new PDN connection is received by the MME via the eNB.

3. The apparatus of claim 1, wherein the option to modify the existing PDN connection includes an option to reduce a bandwidth and/or a quality of service associated with the existing PDN connection.

4. The apparatus of claim 1, wherein the PDN request is a first PDN request, wherein the new PDN connection is a first new PDN connection, wherein the negotiation message is a first negotiation message, wherein the existing PDN connection is a first existing PDN connection, and wherein the management circuitry is further configured to:

receive a second PDN request from the UE or another UE to establish a second new PDN connection with the wireless communication network via the eNB;

transmit, to the UE or the another UE if the levels of congestion of the one or more PGWs or SGWs indicate the high network congestion level that is greater than the threshold, a second negotiation message giving the UE or the another UE an option to terminate or modify a second existing PDN connection associated with the eNB in exchange for establishing the second new PDN connection;

receive a positive response to the second negotiation message;

establish the second new PDN connection based on the positive response; and terminate or modify the second existing PDN connection based on the positive response.

5. One or more non-transitory computer-readable media having instructions, stored thereon, that when executed cause a user equipment (UE) to:

transmit a packet data network (PDN) request to establish a new PDN connection with a wireless communication network via an evolved Node B (eNB);

obtain, responsive to the PDN request, a negotiation message giving the UE an option to terminate or modify an existing PDN connection associated with the eNB in exchange for establishing the new PDN connection;

transmit a negative response to the negotiation message;

wherein the new PDN connection is denied and the existing PDN connection is maintained based on the negative response.

6. The one or more media of claim 5, wherein the instructions, when executed, further cause the UE to obtain a message from the eNB to indicate that the new PDN connection is denied and the existing PDN connection is maintained based on the negative response.

7. The one or more media of claim 5, wherein the request for the new PDN connection is transmitted to a mobility management entity (MME) via the eNB.

8. The one or more media of claim 5, wherein the option to modify the existing PDN connection includes an option to reduce a bandwidth and/or a quality of service associated with the existing PDN connection.

9. The one or more media of claim 5, wherein the PDN request is a first PDN request, wherein the new PDN connection is a first new PDN connection, wherein the negotiation message is a first negotiation message, wherein the existing PDN connection is a first existing PDN connection, and wherein the instructions, when executed, further cause the UE to:

transmit a second PDN request to establish a second new PDN connection with the wireless communication network via the eNB;

obtain, responsive to the second PDN request, a second negotiation message from the eNB giving the UE an option to terminate or modify a second existing PDN connection associated with the eNB in exchange for establishing the second new PDN connection;

transmit a positive response to the second negotiation message;

establish the second new PDN connection based on the positive response; and terminate or modify the second existing PDN connection based on the positive response.

10. The one or more media of claim 5, wherein the negotiation message is obtained by the UE responsive to the PDN request and an indication that a congestion level of a user plane of the wireless communication network is above a threshold.

* * * * *